United States Patent [19]

Hiller

[11] 3,928,127
[45] Dec. 23, 1975

[54] METHOD FOR DETERMINING RAPID DENSITY FLUCTUATIONS OF NUCLEAR REACTOR COOLANTS

[75] Inventor: Sigwart Hiller, Lauf, Pegnitz, Germany

[73] Assignee: Siemens Aktiengesellschaft, Munich, Germany

[22] Filed: Sept. 6, 1973

[21] Appl. No.: 394,754

[30] Foreign Application Priority Data
Sept. 29, 1972 Germany............................ 2247745

[52] U.S. Cl................................................. 176/19 R
[51] Int. Cl............................................. G21c 17/02
[58] Field of Search............ 176/19 R, 195; 250/308, 250/356, 363, 364

[56] References Cited
UNITED STATES PATENTS

| | | | |
|---|---|---|---|
| 3,101,409 | 8/1963 | Fite | 250/363 |
| 3,376,200 | 4/1968 | Ward | 176/19 R |
| 3,389,251 | 6/1968 | Rainbault et al. | 250/364 |
| 3,470,372 | 9/1969 | Bayly | 250/364 |
| 3,691,386 | 9/1972 | Cavanaugh | 250/356 |

*Primary Examiner*—Stephen C. Bentley
*Attorney, Agent, or Firm*—Kenyon & Kenyon Reilly Carr & Chapin

[57] ABSTRACT

The nuclear reactor coolant flowing in a pipe is continuously irradiated by a nuclear radiation source and the not absorbed component thereof is measured by means of a detector. The signals of the latter are fed, via an amplifier and a discriminator, to a multi-channel analyzer in a multi-scaling circuit configuration with adjustable channel-switching frequency. Here, they are first stored and later transferred to an indicating or recording instrument for, preferably, automatic further processing.

3 Claims, 1 Drawing Figure

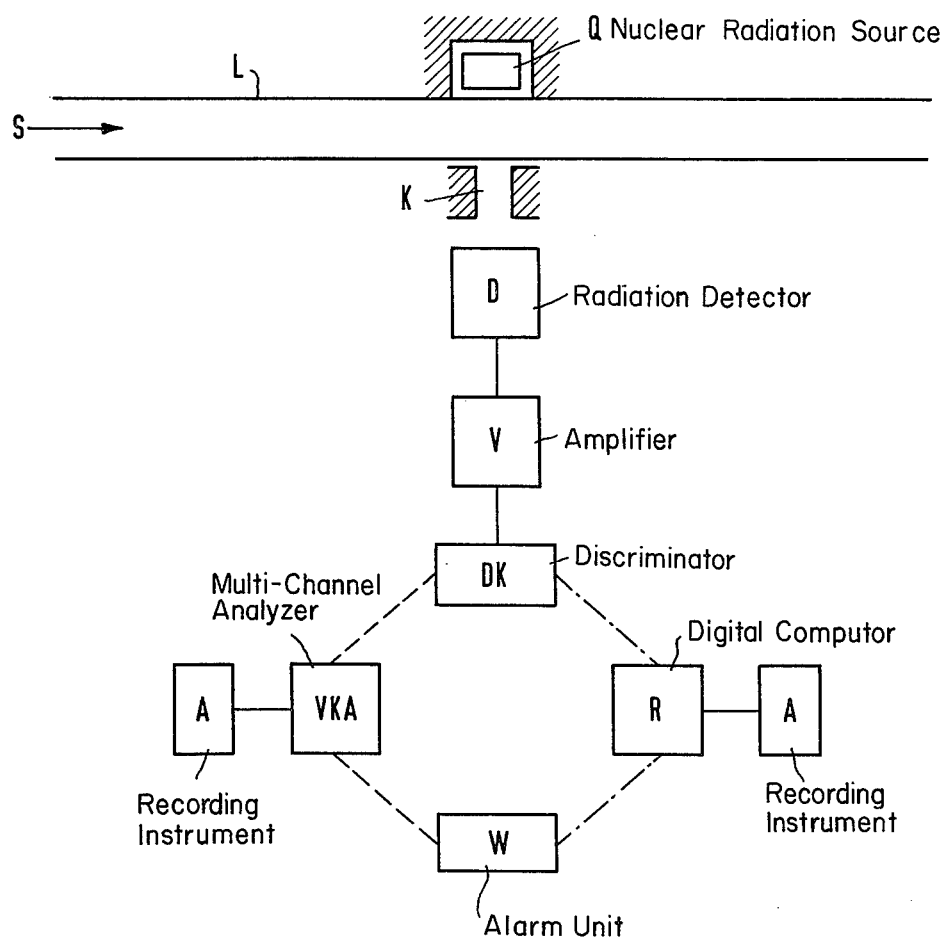

METHOD FOR DETERMINING RAPID DENSITY FLUCTUATIONS OF NUCLEAR REACTOR COOLANTS

BACKGROUND OF THE INVENTION

The present invention concerns a method for determining rapid density fluctuations of a nuclear reactor coolant flowing in a pipe, by means of nuclear radiation transmitted into the coolant flow, on the basis of the difference in radiation absorption by the coolant flow. In nuclear reactor installations using various kinds of systems, the problem frequently arises of recognizing density fluctuations of the coolant in due time and to derive therefrom appropriate measures for the operation of the installation. Thus, it is, for instance, of interest to monitor in water-cooled nuclear reactors the condition of the coolant with respect to boiling. In liquid metal-cooled nuclear reactors, the start of the boiling must similarly be recognized in time, so that timely countermeasures can be taken. Furthermore, cases are conceivable where emergency feeding of cooling water becomes necessary in nuclear reactors and the operation of the latter must be monitored. The density fluctuations of the coolant, which occur in all cases, whether they are different stages of a steam-water mixture or larger steam or air bubbles in the water, or vapor or gas bubbles in the liquid metal, can be determined by means of the difference in the absorption by the coolant of radiation radiated into the coolant from a nuclear radiation source. Signals obtained from the coolant by a nuclear radiation detector are usually processed, in this case, in a rate meter and displayed via a chart recorder on a running paper strip. If, however, the density fluctuations follow each other very rapidly, which may, for instance, be the case with very high coolant flow velocities, this method is either too slow or the output of recording paper is so large that an evaluation becomes quite difficult.

The problem therefore arises to find an improved method which for practical purposes no longer has any inherent inertia of the instrumentation and even at the highest coolant flow velocities furnishes results which can be called up and evaluated simply.

SUMMARY OF THE INVENTION

According to the invention, this problem is solved by providing that the pipe, through which the nuclear reactor coolant may in some cases flow with a very high velocity, is irradiated by a nuclear radiation source, and that the unabsorbed or transmitted radiation component is measured by means of a detector producing electric signals, and the signals are amplified and fed via a discriminator, as pulses, to a multi-channel analyzer in a multi-scaling circuit arrangement having adjustable channelswitching frequency, where the signals are stored and transferred from it to an indicating or recording instrument for, preferably, automatic further processing. The multi-channel analyzer can be replaced by a digital computer, which stores the pulses arriving from the discriminator within adjustable successive time intervals, in its memory, so that they can be called up at any time for recording or further processing.

The measuring limits, which exist also with this method, result solely from the speed of the detector system, the amplifier electronics and the laws of statistics. Difficulties due to different pulse amplitudes no longer occur, as the pulses delivered by the detector via an amplifier are transformed in the discriminator into standardized squar-wave pulses. These are then able to operate the multi-channel analyzer in an unequivocal manner, so that the individual channels thereof, which are addressed successively with an adjustable channel-switching frequency, can securely and reliably receive and store the signals transmitted by the radiation detector. The "on" period of a channel can be set here down to about 10 ms; if the velocity of the coolant is 10 m/s, this corresponds to the recording of about one millimeter of coolant flow.

BRIEF DESCRIPTION OF THE DRAWING

The practice of this method is schematically illustrated by the accompanying drawing.

DETAILED DESCRIPTION OF THE INVENTION

Referring to this drawing, the arrangement of the measurement instrumentation for implementing this method is shown schematically. The coolant S, whose density, i.e., for instance, the steam or gas bubble content of which is to be determined, flows through the pipe L. On one side of this line is located the nuclear radiation source Q, which is shielded from the environment by biological shielding K. The radiation from this source, transmitted through the pipe and coolant, arrives in more or less attenuated form on the other side of the line L at the radiation detector D, for instance, and NaI (TL) scintillation counter followed by a photomultiplier. The pulses generated there by interaction with the quanta of the nuclear radiation, are subsequently amplified in an amplifier V and these pulses are then passed on to a discriminator DK. As already mentioned, they are transformed there into standardized pulses of equal amplitude and fed either to a multi-channel analyzer VKA or to a digital computer R. Preferably the computer should be used to store the pulses arriving in adjustable time intervals, in its memory. To these equipments an indicating or recording instrument A is connected, which prints out, or makes visible, for instance, on a picture screen, the number or pulses stored in the individual channels of the multi-channel analyzer. It is furthermore possible to connect to the multi-channel analyzer, or the computer, respectively, an alarm unit W which calls the situation to the attention of the operating or control personnel if an adjustable limit is exceeded. It would, of course, also be possible to trigger via this unit, already pre-programmed measures for correcting the determined improper condition of the coolant.

Other forms of instrumenting the method according to the invention are, of course, also possible. Thus, a commercially available pulse timing counter, which feeds the pulses accumulated within settable time intervals to a printer or also directly to the computer, can also be connected following the discriminator. The digitally available data can also be converted into analog form via known digital-to-analog converters, which can be advantageous as an aid to evaluating phases of particular interest of such a monitoring method.

The radiation source selected, as to the type of radiation and its energy, should be that giving the largest possible differences in absorption between the coolant and its steam or void content.

Water or liquid metals are to be considered as examples of coolants. Appropriate sources are selected in view of the energy-dependent absorption conditions in these substances. For aqueous coolants, Am 241, for instance, is highly suited. For sodium as the coolant, Cs 137, for instance, should be considered, and X-rays may be used for gaseous coolants.

It should further be mentioned here that for monitoring the coolant circulation, the detector and the nuclear radiation source can perfectly well be located at coolant-carrying lines in rooms which are normally not accessible to the operating personnel. The reactor radiation existing there must, of course, be shielded off by measures known per se. The other equipment, such as the discriminator and the multi-channel analyzer, or the computer, are in that case advantageously located in the operations central of the reactor installation in question.

The disadvantage of the multi-channel analyzer is that it has only a limited number of channels. It is therefore suitable only for relatively brief checks. In contrast thereto, it is possible to connect the computer R in such a manner that it has practically any desired number of counting channels in its memory. It can therefore be used for measurements of longer duration and can include also the alarm unit W through appropriate circuitry or programming measures.

The field of application of the method described can, of course, be expanded substantially further. Quite generally, it can be stated that its use is indicated in all cases where possibly very rapidly occurring fluctuations in the absorption properties for nuclear radiation, of the medium or material to be measured, are involved.

What is claimed is:

1. A method for determining rapid density fluctuations of a nuclear coolant flowing in a pipe by irradiating the coolant by a nuclear radiation source and detecting differences in the absorption of the radiation by the coolant; wherein the improvement comprises detecting unabsorbed radiation transmitted through the coolant flow to produce electric signals which are amplified and shaped into standardized pulses of equal amplitude, said pulses being stored at successive time intervals of short duration.

2. The method of claim 1 in which said pulses are fed to a multi-channel analyzer having adjustable channel switching frequency.

3. The method of claim 1 in which said pulses are fed to a computer and stored there in adjustable time intervals.

* * * * *